May 29, 1923.  1,457,259
A. M. MALLUK ET AL
RESILIENT BUMPER FOR MOTOR VEHICLES
Filed June 9, 1922
Fig. 1,
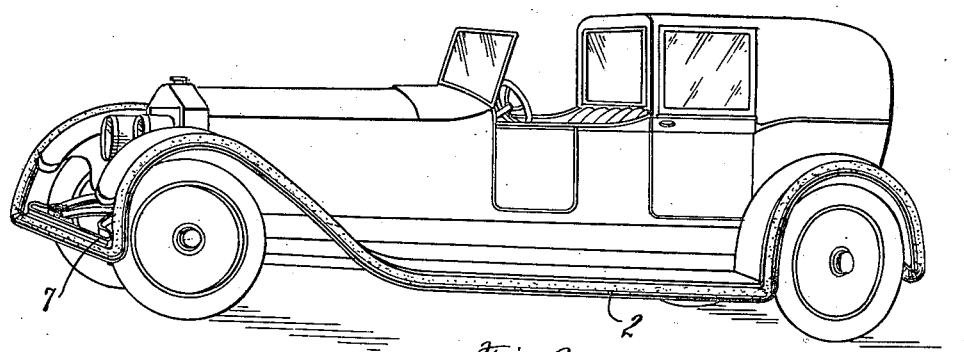
Fig. 2,
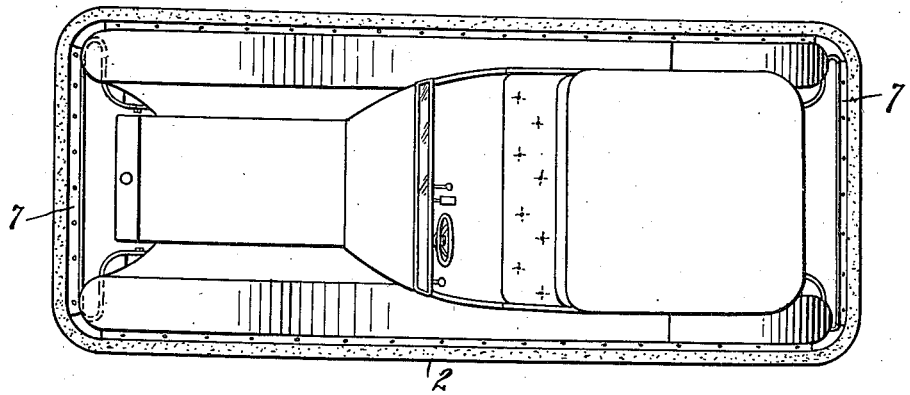
Fig. 3,
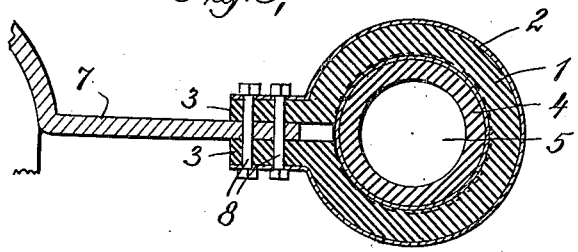
Fig. 4,
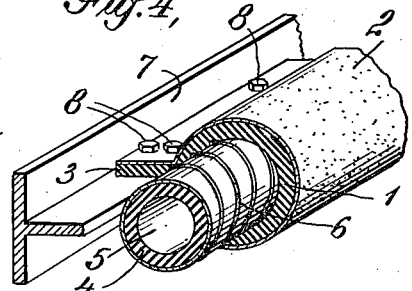
INVENTORS
Asrad M. Malluk
Jean H. Horie
BY
Pennie Davis Marvin & Edmonds.
ATTORNEY Patented May 29, 1923.

1,457,259

UNITED STATES PATENT OFFICE.

ASSAD M. MALLUK AND JEAN U. KORÉE, OF NEW YORK, N. Y., ASSIGNORS TO INTERNATIONAL PATENT INVESTMENT CORPORATION, OF NEW YORK, N. Y., A CORPORATION OF DELAWARE.

RESILIENT BUMPER FOR MOTOR VEHICLES.

Application filed June 9, 1922. Serial No. 567,023.

*To all whom it may concern:*

Be it known that we, ASSAD M. MALLUK, a citizen of the Republic of France, residing at and whose post-office address is No. 170 West 72d Street, in the city, county, and State of New York, and JEAN U. KORÉE, a subject of the King of Rumania, residing at and whose post-office address is No. 1834 Broadway, in the city, county, and State of New York, have invented certain new and useful Improvements in Resilient Bumpers for Motor Vehicles; and we do hereby declare the following to be a full, clear, and exact description of the invention, such as will enable others skilled in the art to which it appertains to make and use the same.

This invention relates to resilient bumpers for motor vehicles, the principal object being to provide a bumper of improved construction which is especially adapted to encircle the motor vehicle completely.

One object of the invention is to provide an improved resilient bumper which is adapted to be secured to a vehicle in such a manner that it extends out from the vehicle to protect all sides thereof.

The improved bumper comprises several layers of resilient material which are so constructed and assembled that the resilient qualities of each layer are used to the best advantage, the resilient effects being cumulative. The improved bumper comprises an outer casing made of resilient material such as rubber, and an inner tube having walls which are comparatively thick, the walls also being made of resilient material. The outer casing may be made in any suitable shape; the cross section may be circular, oval or of any other desired shape. The inner tube may also be made in any suitable shape to conform to the shape of the outer casing. If it is so desired, a covering or sleeve may be used on the outside of the outer casing, and this covering or sleeve may be painted, or otherwise treated so as to impart to the vehicle a good appearance.

A metallic frame work may be provided for supporting the bumper, this frame work extending entirely around the vehicle or only partly around the vehicle. In the latter event, this metallic frame may be used at the front and back of the vehicle only, and the bumper may be supported on the sides of the vehicle by means of the fenders and running boards, or suitable members associated therewith. A suitable flange is provided on the outer casing so that it may be attached to the metallic frame or to the fenders. The outer casing may be secured to the vehicle by means of clamps or bolts, or other equivalent means adapted to engage the metal frame work, or the fenders.

The inner tube is preferably made hollow, and so constructed that it extends entirely around the vehicle, the tube being continuous throughout its length. If it is so desired air, under pressure, may be supplied to this inner tube thus furnishing an additional cushioning means. The inner tube is preferably enclosed in a wire casing, the wire being formed in a spiral about the tube.

From the above description it should be apparent that the invention comprises an improved resilient bumper composed of a plurality of layers of resilient material each of which is constructed and assembled so that the resilient effects of the various layers are cumulative. The outer casing and the inner tube are made of resilient material, the walls of the tube being comparatively thick. The wire casing provided around the inner tube is also resilient. Furthermore, the air in the inner tube, whether under pressure or not, furnishes an additional resilient cushioning means. The improved bumper is especially adapted to encircle the vehicle, the inner tube being preferably continuous throughout its length.

The above advantages and numerous others will be apparent from the following description which is to be taken in conjunction with the accompanying drawings.

In the drawings;

Fig. 1 is a perspective view of a motor vehicle provided with the improved bumper;

Fig. 2 is a top plan view of the vehicle of Fig. 1, showing the bumper passing entirely around the vehicle;

Fig. 3 is a transverse section of the improved bumper showing the construction, and the method of attaching the bumper on the vehicle.

Fig. 4 is a perspective view, partly in section, showing the construction of the bumper.

By referring to the drawings and more particularly to Figs. 3 and 4, it will be noted that the improved bumper comprises an outer casing 1 which is made of resilient material, such as rubber. A sleeve or covering 2 may be provided on the outside of the casing 1. This sleeve 2 may be made of fabric or any other suitable material adapted to enclose the outer casing, and which is flexible so that it is free to be displaced with the outer casing. The outer casing 1 is provided with a double flange 3 by means of which it may be secured to the vehicle. An inner tube 4 is provided, this tube being made of resilient material, such as rubber, and is preferably adapted to encircle the vehicle. The tube 4 is also substantially air tight so that it may hold compressed air which fills the space 5 in the tube.

A wire casing 6 may be provided on the outside of the inner tube 4. This casing 6 may consist of a wire wound in the form of a spiral, a typical spiral casing being shown in Fig. 4.

A flanged frame work 7 may be provided around the periphery of the vehicle, or it may be provided at the front and back portions only. The flange of this frame work is adapted to be inserted between the two parts of the double flange 3 of the outer casing 1. The outer casing 1 is secured to the flanged frame 7 by means of bolts 8, or other equivalent means. The bolts 8 extend through holes provided in the double flange 3 and in the flange 7.

If it is so desired, the improved bumper may be fastened to the sides of the vehicle by securing the double flange 3 to the fenders and the running boards.

The improved bumper is preferably so attached to the vehicle that it follows the line of the fenders and running boards. It is entirely possible to mount the bumper on the vehicle so that it follows a substantially straight line around the vehicle, or any other desired configuration. If the bumper is attached as shown in the drawing, that is, so that it follows the line of the fenders and running boards, it imparts a very pleasing appearance to the vehicle.

It is to be understood that the size, proportions and configuration of the various parts and material of which they are made may be varied without departing from the principle of the invention which is not confined to the particular embodiment shown and described, but is intended to include such modifications thereof as fall within the scope of the appended claims.

We claim:

1. A resilient bumper adapted to encircle a motor vehicle, said bumper comprising a resilient casing continuous throughout its length, an inner tube reinforced with wire, and means associated with said casing whereby it may be secured to the motor vehicle so as to extend outward and protect all sides thereof.

2. A resilient bumper comprising an outer casing of resilient material, an inner tube within said casing, and a wire casing between said outer casing and inner tube, said outer casing having a flange thereon whereby it may be secured to a motor vehicle.

3. A resilient bumper comprising a resilient outer casing having a double flange integral therewith, an inner tube within said casing, and a wire casing beneath said outer casing and inner tube, said wire casing comprising a wire formed in a spiral about the inner tube.

4. A resilient bumper comprising a resilient outer casing having a double flange whereby said casing may be fastened to a motor vehicle following the line of the fenders and running boards so as to protect all sides of the vehicle, a thick walled inner tube within said casing, and a wire casing between said outer casing and inner tube; said outer casing, inner tube, and wire casing being arranged so that they form a substantially unitary resilient cushion.

5. A resilient bumper comprising an outer casing of resilient material, a covering of fabric enclosing said casing, a thick walled resilient inner tube within said outer casing, a wire casing around said inner tube comprising a spiral of wire, a flange on said outer casing and means for fastening said outer casing to a vehicle.

6. A resilient bumper comprising an outer casing of rubber, a covering of fabric enclosing said casing, a continuous thick walled air-tight inner tube of rubber within said outer casing, a wire casing around said inner tube comprising a spiral of wire, a flange on said outer casing, and means for fastening said outer casing to a vehicle, said bumper being adapted to encircle the vehicle following the line of the fenders and the running boards of the vehicle.

7. In combination with an automobile, a resilient bumper secured thereto and arranged to protect the sides of the vehicle as distinguished from the ends thereof, said bumper comprising a resilient outer casing and an inner tube.

8. In combination with an automobile, a resilient bumper secured thereto and arranged to protect all sides of the vehicle, said bumper comprising a resilient outer casing, and a substantially air-tight wire reinforced inner tube, said casing and tube forming a continuous protective device completely encircling the vehicle.

9. In combination with an automobile, a resilient bumper secured thereto and arranged to protect all sides of the vehicle, said bumper comprising a resilient outer casing and a substantially air-tight wire reinforced inner tube, said casing and tube forming a continuous protective device completely encircling the vehicle following the line of the fenders and running boards.

10. In combination with an automobile, a resilient bumper secured thereto and arranged to protect the sides of the vehicle as distinguished from the ends thereof, said bumper comprising a resilient outer casing and a wire reinforced inner tube.

In testimony whereof we affix our signatures.

ASSAD M. MALLUK.
JEAN U. KORÉE.